United States Patent
Dovek et al.

(10) Patent No.: US 6,842,969 B2
(45) Date of Patent: Jan. 18, 2005

(54) PROCESS FOR MANUFACTURING A MAGNETIC READ HEAD

(75) Inventors: Moris Dovek, San Jose, CA (US); Po-Kang Wang, San Jose, CA (US); Chen-Jung Chien, Sunnyvale, CA (US); Chyu-Jiuh Torng, Pleasanton, CA (US); Yun-Fei Li, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 82 days.

(21) Appl. No.: 10/116,984

(22) Filed: Apr. 5, 2002

(65) Prior Publication Data

US 2003/0189801 A1 Oct. 9, 2003

(51) Int. Cl.[7] ............................ G11B 5/127; H04R 31/00
(52) U.S. Cl. ........................ 29/603.14; 29/603.07; 29/603.09; 29/603.14; 360/324.1; 360/324.11; 360/324.12; 427/127; 427/128
(58) Field of Search .................... 29/603.07, 603.09, 29/603.13, 603.14, 603.15, 603.16; 360/324.1, 324.11, 324.12, 234.1, 234.2, 234.3; 427/127–131; 216/39, 41, 48

(56) References Cited

U.S. PATENT DOCUMENTS

| | | | |
|---|---|---|---|
| 5,637,235 A | 6/1997 | Kim et al. | 216/22 |
| 6,185,078 B1 * | 2/2001 | Lin et al. | 360/324.12 |
| 6,208,491 B1 * | 3/2001 | Pinarbasi | 360/324.1 |
| 6,266,218 B1 | 7/2001 | Carey et al. | 360/324.12 |
| 6,275,362 B1 | 8/2001 | Pinarbasi | 360/324.12 |
| 6,308,400 B1 | 10/2001 | Liao et al. | 29/603.14 |
| 6,310,751 B1 | 10/2001 | Guo et al. | 360/315 |
| 6,338,899 B1 * | 1/2002 | Fukuzawa et al. | 428/332 |
| 6,385,017 B1 * | 5/2002 | Min et al. | 360/324.12 |
| 6,636,396 B1 * | 10/2003 | Gill | 360/324.12 |
| 6,650,512 B1 * | 11/2003 | Gill | 360/324.12 |

FOREIGN PATENT DOCUMENTS

JP      10154618 A  *  6/1998  ......... H01F/10/08

OTHER PUBLICATIONS

"Giant magnetoresistance in CoFe/Cu multilayers with different buffer layers and substrates"; Gangopadhyay, S.; Shen, J.X.; Kief, M.T.; Barnard, J.A.; Parker, M.R.; Magnetics, IEEE Transactions on , vol.: 31 , Issue: 6 , Nov. 1995; pp.:3933–3935.*

* cited by examiner

Primary Examiner—A. Dexter Tugbang
Assistant Examiner—Paul Kim
(74) Attorney, Agent, or Firm—George O. Saile; Stephen B. Ackerman

(57) ABSTRACT

In magnetic read heads based on bottom spin valves the preferred structure is for the longitudinal bias layer to be in direct contact with the free layer. Such a structure is very difficult to manufacture. The present invention overcomes this problem by using a liftoff technique to form, on the free layer, a buffer layer having a trapezoidal cross-section, sloping sidewalls, and a central area of uniform thickness, whose width defines the read track. A suitable bias layer and leads are then deposited on this buffer layer.

6 Claims, 3 Drawing Sheets

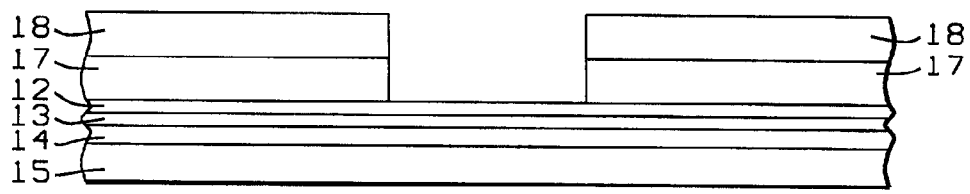
FIG. 1 – Prior Art
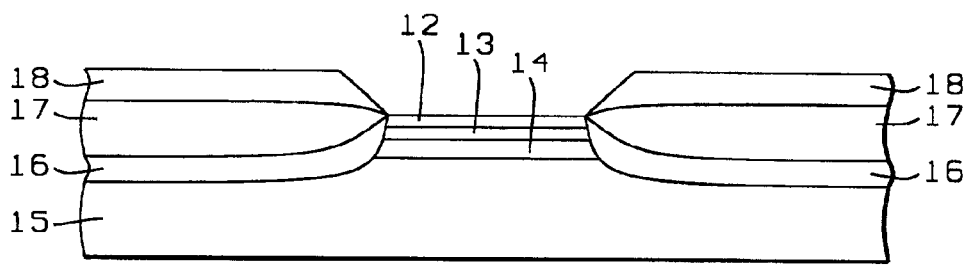
FIG. 2 – Prior Art
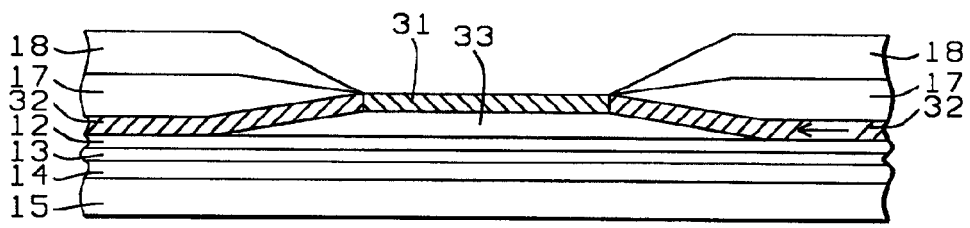
FIG. 3

PROCESS FOR MANUFACTURING A MAGNETIC READ HEAD

FIELD OF THE INVENTION

The invention relates to the general field of magnetic read heads with particular reference to providing longitudinal bias to bottom spin valves.

BACKGROUND OF THE INVENTION

The principle governing the operation of the read sensor in a magnetic disk storage device is the change of resistivity of certain materials in the presence of a magnetic field (MR or magneto-resistance). Magneto-resistance can be significantly increased by means of a structure known as a spin valve. The resulting increase (known as Giant magneto-resistance or GMR) derives from the fact that electrons in a magnetized solid are subject to significantly less scattering by the lattice when their own magnetization vectors (due to spin) are parallel (as opposed to anti-parallel) to the direction of magnetization of the solid as a whole The key elements of what is termed a bottom spin valve, as seen in FIG. 1, are, starting at the topmost level, free magnetic layer 12, non-magnetic spacer layer 13, magnetically pinned layer 14, and pinning layer 15. One advantage of this type of design is that a capping layer, if made of certain materials, can, in addition to protecting the GMR stack from corrosion, also bring about more specular reflection at the free layer-capping layer interface, thereby increasing the conductance. Isolation of the device from extraneous magnetic fields is achieved by sandwiching it between two magnetic shield layers.

Although the layers enumerated above are all that is needed to produce the GMR effect, additional problems remain. In particular, there are certain noise effects associated with such a structure. As first shown by Barkhausen in 1919, magnetization in a layer can be irregular because of reversible breaking of magnetic domain walls, leading to the phenomenon of Barkhausen noise. The solution to this problem has been to provide operating conditions conducive to single-domain films for the GMR sensor and to ensure that the domain configuration remains unperturbed after processing and fabrication steps. This is most commonly accomplished by giving the structure a permanent longitudinal bias provided by two opposing permanent magnets.

One way to implement this is with an exchange biased magnetic layer as also shown in FIG. 1. Seen there is soft magnetic layer 16 which is permanently magnetized through exchange coupling with antiferromagnetic (AFM) layer 17. To ensure magnetic continuity in the GMR sensor, it is preferred that the top magnetic layer not be touched during processing.

In the case of bottom spin valves, it would, in theory, be ideal if the AFM layer could be placed directly in contact with the free layer, with the sensor region being left uncovered to sense the external media field. This is illustrated in FIG. 2. This structure is, however, difficult to build in practice. This is because the GMR film needs to be capped with a layer such a Ta or Ru for corrosion protection of the GMR film and enhanced specular reflection at the free layer outer interface. Once the capping layers are removed the placement of an antiferromagnet directly an top of the free layer presents a problem as building exchange coupling requires a very clean interface. Exchange biased contiguous junctions have been used with GMR devices however their principle of operation are similar to hard biased contiguous junctions.

A routine search of the prior art was performed with the following references of interest being found:

In U.S. Pat. No. 6,266,218, Carey et al. show a MR with a Bottom Spin Valve and patterned exchange process while Pinarbasi describes a MR with a Bottom SV and buffer layer in U.S. Pat. No. 6,275,362. U.S. Pat. No. 6,310,751 (Guo et al.) shows a pattern exchange for a DSMR, U.S. Pat. No. 6,308,400 (Liao et al.) also discloses a pattern exchange for a DSMR and U.S. Pat. No. 5,637,235 (Kim) discloses a Bottom SV.

SUMMARY OF THE INVENTION

It has been an object of at least one embodiment of the present invention to provide a magnetic read head that includes narrow track width, good longitudinal stability, good GMR response, and ease of manufacturability.

Another object of at least one embodiment of the present invention has been to provide a process for manufacturing said read head.

These objects have been achieved by introducing an extra layer between the bias electrodes and the free layer. This layer protects the free layer during processing but is thin enough to not interrupt exchange between the bias electrodes and the free layer. In one embodiment this is a layer of copper about 5 Å thick and parallel exchange is operative. In other embodiments ruthenium is used to provide antiparallel coupling between the bias electrode and the free layer. A process for manufacturing the structure is also described.

BRIEF DESCRIPTION OF THE DRAWINGS

FIG. 1 shows how longitudinal bias to a bottom spin valve is typically provided in the prior art.

FIG. 2 shows a modification of FIG. 1 which is preferred from a performance standpoint but which is more difficult to manufacture.

FIG. 3 shows an improved version of FIG. 1 according to the present invention.

DESCRIPTION OF THE PREFERRED EMBODIMENTS

The present invention discloses a device that has a patterned exchange biasing structure that makes use of the exchange coupling through a metallic buffer layer placed on top of the GMR sensor for ease of manufacturability.

Shown in FIG. 3 is a structure that is more compatible with typical processes than other embodiments that we will disclose below. These other embodiments do, however, come closer to the ideal structure discussed earlier. Ta cap 31 is removed by RIE (reactive ion etching). Copper buffer layer 33 is removed (outside the read gap), in part during the Ta-RIE process and in part by a gentle sputter (or ion beam) etch process. Even if some amount of Cu is left, there is sufficient exchange pinning between the free layer and additional ferromagnetic layer 32 for sensor stabilization to be maintained. Other possible materials for the buffer layer include silver, ruthenium, and rhodium (within critical thickness windows) to provide parallel coupling.

This structure is built by deposition of a GMR stack that is terminated by a buffer layer such as Cu, Ag, Ru, or Rh and a specular reflection layer such as Ta or an oxidation protection layer such as Ru or Rh or any combination thereof. The track (or central area) is defined by photolithography using a liftoff technique. Its width is between about 0.05 and 0.25 microns. Ta is removed by RIE and the Cu spacer is removed by gentle sputter etching. If Ru or Rh is used instead of, or in addition to, Ta they would be removed by ion beam or sputter etching. The total Cu thickness is typically between about 2 and 20 Å, with about 5 Å being preferred, so sufficient exchange pinning remains between free layer 12 and added ferromagnetic layer 32.

Following sputter etching of the Cu, a stack of additional ferromagnetic material of the order of 0.25–1times the free layer thickness is deposited. This layer is any suitable material such as NiFe, CoFe, or Co. It is between about 5 and 75 Angstroms thick. Then, AFM 17, such as PtMn, NiMn or IrMn, is deposited to provide exchange pinning to the tail region. This is the area over which the thickness of the buffer layer tapers off uniformly to zero. It is typically between about 0.01 and 0.20 microns wide.

Figure 4:
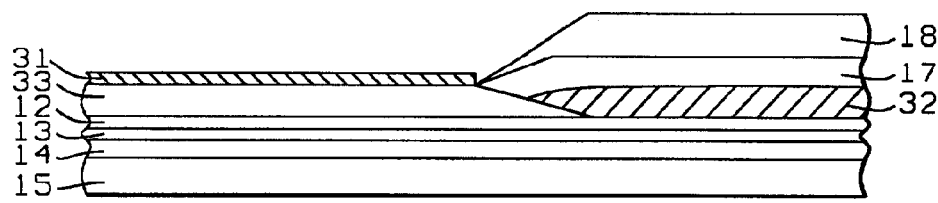
FIG. 4 is an enlarged view of part of FIG. 3.

The antiferromagnet deposition angle is preferably somewhat shallower than for the ferromagnet to facilitate coverage of layer 32 by layer 17. The deposition concludes with leads and photoresist lift-off. The entire structure is then annealed in a longitudinal field to provide exchange pinning from AFM 17 to added ferromagnet 32 and the free layer. The exchange pinning from the antiferromagnet to the added ferromagnet is typically of the order of 200–500 Oe. The exchange pinning across the Cu interface is also within the same range or could be slightly lower. In both these structures the magnetization of the free layer and of the added ferromagnet are parallel to one another (along the longitudinal anneal directions). A closeup view of the junction area of FIG. 3 is shown in FIG 4.

Figure 5:
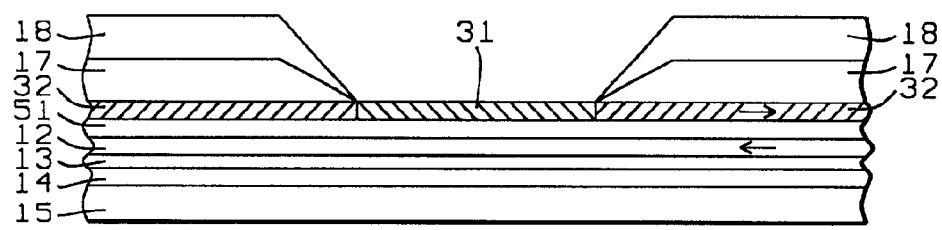
FIGS. 5–7 show three additional embodiments of the present invention that are modifications of FIG. 2, but easier to manufacture.

A second embodiment of the present invention is shown in FIG. 5. It uses antiparallel pinning layer 51 between the tail region and the free layer. This is typically accomplished by using Ru which promotes antiparallel exchange coupling over some thickness range. Other possible materials for this layer include rhodium. Its thickness is typically between about 6 and 11 Angstroms, with about 8 Angstroms being preferred. Thus, layer 51 also serves as a cap to protect the free layer during processing. As in the first embodiment, a final capping layer 31 of tantalum is provided while layer 32 acts as before as an added ferromagnet to define the direction of magnetization associated with AFM layer 17. As shown, the anneal direction for layer 32 is antiparallel to the final magnetization direction of free layer 12.

Figure 6:
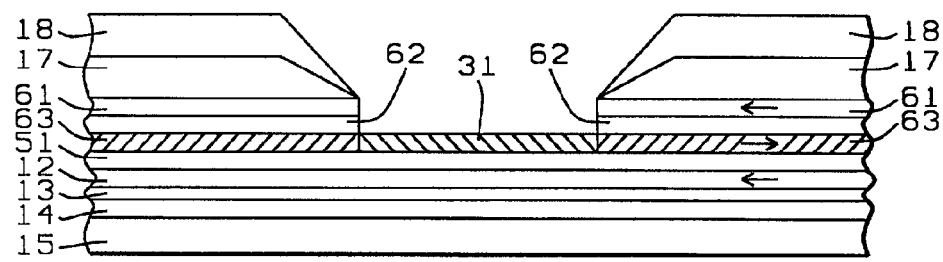

One shortcoming of the above embodiment is the fact that there is no excess moment from the tail region since layers 12 and 32 are annealed at similar temperatures. In fact the total moment of the tail region is lower than the free layer moment. This problem is overcome in a third embodiment of the present invention that utilizes a laminate of two ferromagnetic layers 61 and 63 between which is sandwiched second Ru layer 62, as part of the tail region, as shown in FIG. 6. This ensures that the moment of the tail can be made to exceed the free layer moment. In this embodiment, following the Ta RIE discussed earlier, layers 63, 62, and 61 are deposited in succession followed by AFM layer 17 and leads 18. The three-layer laminate 61–63 is made thicker than the total thickness of layers 12, 51, and 63 to ensure that the net moment at the tail exceeds that of the free layer in the read gap. The anneal direction for AFM 17 is now parallel to the free layer final magnetization direction.

Figure 7:
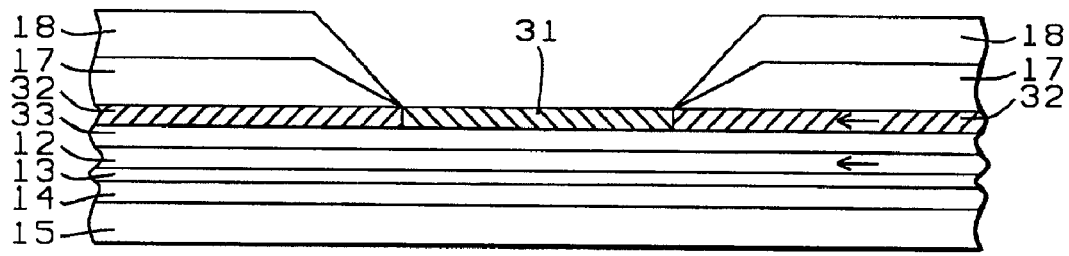

The fourth embodiment of this invention is a patterned exchange type device illustrated in FIG. 7. Here etching into the free layer is controlled by using buffer layer 33 (of a material such as copper) in a similar way to which it was used in the first embodiment (see FIG. 3). In this structure the GMR is capped by a combination of Cu (known to enhance the GMR effect at low free layer thicknesses) and Ta (for improved specularity). Following the photoresist process, the Ta cap is removed by RIE and the additional ferromagnet as well as the antiferromagnet for exchange pinning is deposited on top of Cu buffer layer 33. There is sufficient exchange pinning between the free layer and the additional ferromagnet through the Cu layer to promote adequate sensor stabilization. Thus the direction of magnetization is the same for the AFM and the free layer, as in conventional structures with the key difference that free layer 12 was protected by buffer layer 33 during processing and since the thickness of 33 is not critical, some of it may be removed prior to depositing layer 32 thereby ensuring no interference with the exchange coupling between 12 and 32.

What is claimed is:

1. A process for manufacturing a magnetic read head, comprising:

on a substrate, forming a GMR stack whose topmost layer is a magnetically free layer;

then, by means of a liftoff technique, forming, on said free layer, a buffer layer having a trapezoidal cross-section, sloping sidewalls, a central area of uniform thickness and a width that defines a read track;

then depositing a capping layer on all exposed surfaces;

then, fully removing said capping layer everywhere except from said central area whereby at least some portion of said buffer layer also gets removed;

selectively depositing a soft ferromagnetic layer on said sloping sidewalls, any residual buffer layer material on said sidewalls being thin enough to permit propagation of exchange forces between said soft ferromagnetic layer and said free layer;

depositing an antiferromagnetic layer on said soft ferromagnetic layer; and depositing a conductive lead layer on only said antiferromagnetic layer.

2. The process described in claim 1 wherein said buffer layer is selected from the group consisting of copper, silver, ruthenium, and rhodium.

3. The process described in claim 1 wherein said central area of uniform thickness of said buffer layer is deposited to a thickness between about 2 and 20 Angstroms.

4. The process described in claim 1 wherein said read track has a width between about 0.05 and 0.20 microns.

5. The process described in claim 1 wherein said soft ferromagnetic layer is selected from the group consisting of NiFe, CoFe, and Co.

6. The process described in claim 1 wherein said soft ferromagnetic layer is deposited to a thickness between about 5 and 75 Angstroms.

* * * * *